2 Sheets—Sheet 1.
J. Hendy,
Friction Clutch.
Nº 25,733.      Patented Oct. 11, 1859.
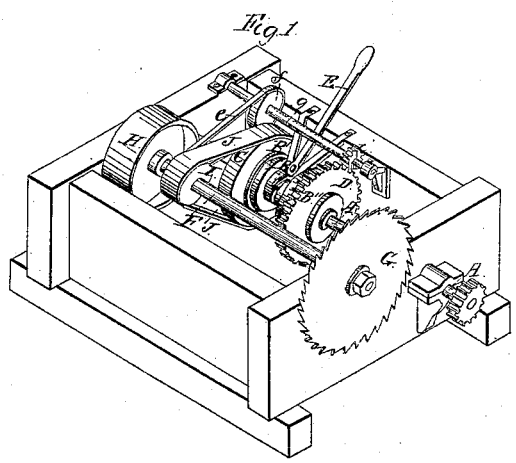
Witnesses.
Thos. H. Upperman
E. Cohen
Inventor
Joshua Hendy
per A. B. Stoughton, atty

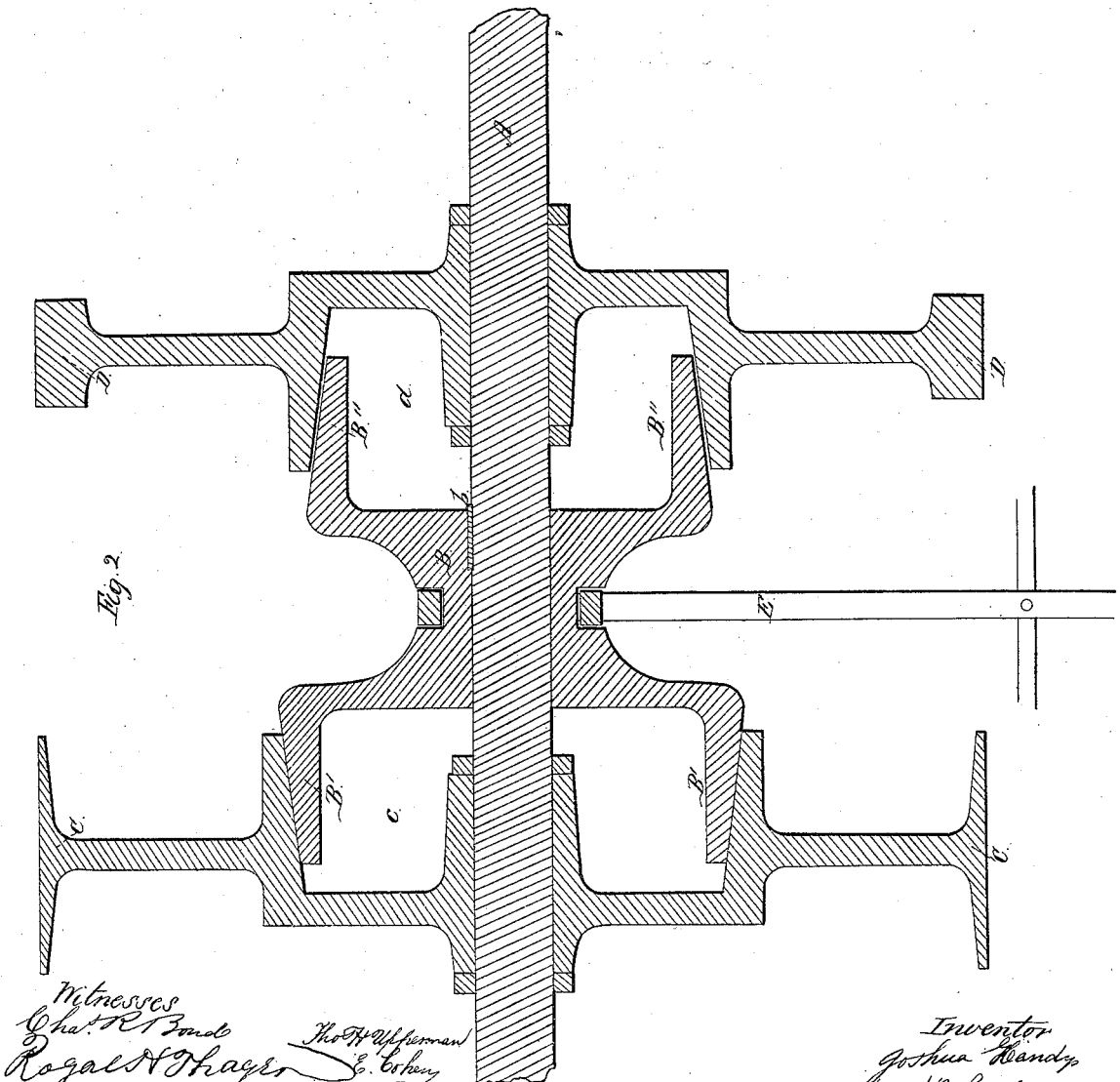

UNITED STATES PATENT OFFICE.

JOSHUA HENDY, OF SAN FRANCISCO, CALIFORNIA.

DOUBLE FRICTION-COUPLING.

Specification forming part of Letters Patent No. 25,733, dated October 11, 1859; Reissued March 25, 1873, No. 5,335.

*To all whom it may concern:*

Be it known that I, JOSHUA HENDY, of the city and county of San Francisco and State of California, have invented a new and useful Improvement for a Double Coupling for Shafting, which I call "Hendy's Double Friction-Coupling;" and I do hereby declare that the following is a full, clear, and exact description of the construction and operation of the same, reference being had to the annexed drawings, making a part of this specification, in which—

Figure 1 represents in perspective my double friction clutch, as applied to saw mills, and Fig. 2 is a sectional drawing, longitudinally of the shaft and transversely of the pulley and spur-wheel, and on an enlarged scale.

A, represents the shaft; B, is a double male coupling fixed to the shaft by the key b, each end of the coupling B', and B'', is in the form of a truncated cone playing respectively into the cavities c, and d, of the pulley C, and spur-wheel D, said pulley and spur-wheel being loose upon the shaft, or instead of the pulley and spur-wheel, two pulleys may be used or two spur-wheels; E, is a lever, one end of which is attached to the coupling B, and by it the shaft A, may be thrown into connection with either the pulley C, or the spur-wheel D; being held perfectly firm in position by the friction of the sides of the truncated cones of the coupling B, against the sides of the cavities or conical sleeves c, or d, as the case may be. When the pulley is in connection with the shaft, the spur-wheel is loose, and vice versa, or the coupling may be disconnected from both and the shaft be in state of rest.

F, is the saw shaft, on which the saw G, is placed. Motion may be communicated to this shaft, by an endless belt from any first moving power, passing around the pulley H. There is also a pulley I, on the saw shaft, around which, and around the pulley C, on the shaft A, passes an endless belt J. When the clutch B, is thrown into gear with the pulley C, then the shaft A, is rotated through said pulley C. An endless belt e runs from the shaft F, around a pulley f, on a shaft g, and on this shaft g, there is a pinion i, that takes into the cogs of the wheel D, on said shaft A, and when the clutch is connected with the cog wheel D, then the shaft A, takes its motion from D, thus changing its speed or direction at pleasure.

The advantages of this coupling over all others in use will be more readily shown in its use for operating saw-mill carriages, as follows: When the coupling B, is disconnected from both the pulley and spur-wheel, the carriage will be at rest, when it is desired to feed the carriage, the shaft by means of the coupling B, is brought into connection with the spur-wheel D, and is propelled in the direction of the saw; to back the carriage, the shaft is disconnected from the spur-wheel, and connection is made with the pulley C, which moving in a reverse direction from that of the spur-wheel, changes the direction of the shaft, by which a backward direction is given to the movement of the carriage; should the backward motion of the carriage be too fast, it is only necessary to ship the coupling into the spur-wheel D, sufficiently far to operate as a brake. Another great advantage is that if in feeding up the carriage, the saw running at its full capacity, should come in contact with a large knot, the coupling can be slacked so that the feeding will be done more lightly, and thus obviate the necessity of stopping the speed of the saw to prevent its being buried in the knot and becoming injured. It obviates the necessity of employing so many handles or levers as are in use in all saw-mills, one lever being all that is required to feed the carriage, to slow it, to stop it, to back it.

It is not only to saw-mill carriages that this is applicable; it is useful wherever a quick reversible movement is required, or where the same driving shaft is to be used to drive machinery in different parts of a building alternately.

I do not claim a coupling in the shape of a truncated cone fitting in a cavity or conical sleeve, as the same has been heretofore in use.

What I claim, Is the application of two such truncated cones to one coupling, one at either end and operated by a single lever so as to work in cavities, or conical sleeves attached to pulleys or wheels arranged on one shaft, so that said shaft may be run slow or fast, or backward or forward, or entirely stopped without stopping the prime motor, or changing its speed, substantially as herein set forth and explained.

Dated at San Francisco this nineteenth day of July 1859.

JOSHUA HENDY.

Witnesses:
CHAS. R. BOND,
RAZAL H. THAYER.